(12) United States Patent
Blais

(10) Patent No.: US 7,242,407 B2
(45) Date of Patent: Jul. 10, 2007

(54) REPROJECTING MAP IMAGES USING GRAPHICAL TECHNIQUES

(75) Inventor: Marc Blais, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 296 days.

(21) Appl. No.: 10/957,621

(22) Filed: Oct. 5, 2004

(65) Prior Publication Data
US 2005/0264577 A1    Dec. 1, 2005

Related U.S. Application Data

(60) Provisional application No. 60/574,924, filed on May 28, 2004.

(51) Int. Cl.
G09G 5/00 (2006.01)

(52) U.S. Cl. .................................... 345/582

(58) Field of Classification Search ............... 345/538, 345/552, 582, 586, 588, 211; 353/5, 11, 353/12, 13, 14; 382/108, 174, 176, 190, 382/206, 285, 316; 701/1–302
See application file for complete search history.

(56) References Cited

U.S. PATENT DOCUMENTS

| | | |
|---|---|---|
| 4,876,651 A | 10/1989 | Dawson et al. |
| 4,903,216 A | 2/1990 | Huss et al. |
| 4,970,682 A | 11/1990 | Beckwith, Jr. et al. |
| 5,086,396 A | 2/1992 | Waruszewski, Jr. |
| 5,179,638 A | 1/1993 | Dawson et al. |
| 5,319,744 A * | 6/1994 | Kelly et al. ................. 345/647 |
| 5,355,442 A | 10/1994 | Paglieroni et al. |
| 5,506,947 A | 4/1996 | Taubin |
| 5,526,260 A | 6/1996 | Kodet et al. |
| 5,630,035 A | 5/1997 | Gjullin et al. |
| 5,631,640 A | 5/1997 | Deis et al. |
| 5,781,195 A | 7/1998 | Marvin |
| 5,838,262 A | 11/1998 | Kershner |
| 6,047,236 A | 4/2000 | Hancock et al. |

(Continued)

FOREIGN PATENT DOCUMENTS

EP    0 337 338 B1    10/1989

(Continued)

OTHER PUBLICATIONS

*Three-Dimensional Intervisibility Algorithm*, IBM Technical Disclosure Bulletin, Jul. 1991, pp. 61-66.

(Continued)

*Primary Examiner*—Matthew C. Bella
*Assistant Examiner*—G. F. Cunningham
(74) *Attorney, Agent, or Firm*—Miles & Stockbridge PC; James T. Carmichael

(57) ABSTRACT

A system and method of re-projecting a map image using graphical techniques is provided. A digital map image, in a first projection, may be divided into a number of rectangular sub-images, the geographic coordinates for the four corners of the rectangular sub-image may be computed, the planar coordinates in a second projection may be computed for the four corners of each rectangular sub-image, and each sub-image and its corresponding second projection coordinates may be supplied to a texture mapping subroutine with optional hardware acceleration of the texture mapping process in order to create a second map image in a second projection.

18 Claims, 6 Drawing Sheets

U.S. PATENT DOCUMENTS

| | | | |
|---|---|---|---|
| 6,097,397 A * | 8/2000 | Lee | 345/586 |
| 6,191,795 B1 | 2/2001 | Liepa | |
| 6,232,980 B1 | 5/2001 | Liepa | |
| 6,288,721 B1 | 9/2001 | Donoghue et al. | |
| 6,308,132 B1 | 10/2001 | Wilson et al. | |
| 6,317,690 B1 | 11/2001 | Gia | |
| 6,401,038 B2 | 6/2002 | Gia | |
| 6,430,548 B1 | 8/2002 | Deis et al. | |
| 6,434,481 B2 | 8/2002 | Winter et al. | |
| 6,476,813 B1 | 11/2002 | Hansen | |
| 6,529,821 B2 | 3/2003 | Tomasi et al. | |
| 6,583,790 B1 | 6/2003 | Wolters | |
| 6,600,489 B2 | 7/2003 | Cook | |
| 6,677,957 B2 | 1/2004 | Grzeszczuk et al. | |
| 6,707,452 B1 | 3/2004 | Veach | |
| 2002/0033821 A1 | 3/2002 | Starti | |
| 2003/0034981 A1 | 2/2003 | Wada | |
| 2004/0007121 A1 | 1/2004 | Graves et al. | |
| 2004/0030492 A1 | 2/2004 | Fox et al. | |

FOREIGN PATENT DOCUMENTS

| | | |
|---|---|---|
| WO | WO 95/19544 | 7/1995 |
| WO | WO 95/19545 | 7/1995 |
| WO | WO 95/19546 | 7/1995 |

OTHER PUBLICATIONS

*Terrain Exposure Factor*, IBM Technical Disclosure Bulletin, Jan. 1994, pp. 649-652.

* cited by examiner even though
REPROJECTING MAP IMAGES USING GRAPHICAL TECHNIQUES This application claims the benefit of U.S. Provisional Application No. 60/574,924, filed May 28, 2004, which is incorporated herein by reference.

The present invention relates generally to digital cartography and, more particularly, to converting a digital map in a first projection to a digital map in a second projection using computer graphics techniques.

A map, as used herein, refers to a graphical representation of a physical object, an area or region of an object and/or the like, such as, for example, a portion of the surface of the earth. Maps may be used to communicate spatial relationships, form, distances, directions, adjacency, and/or the like. Maps are typically reductions, in that the map may be smaller than the region it portrays. The dimensional relationship between a map and the region it portrays is referred to herein as the scale of the map.

A map typically involves a geometrical transformation. For example, it may be common to transform an essentially spherical surface (like the earth) to a surface that may be easier to work with, such as, for example, a computer screen, a piece of paper, and/or the like. Such a systematic geometrical transformation is referred to herein as a projection.

There are many types of map projections, such as, for example, Mercator, gnomonic and Alber's equal-area projection. The selection of a particular map projection frequently depends on the contemplated use of the map. For example, a gnomonic projection has the property that all great-circle arcs are represented as straight lines anywhere on the projection, making a gnomonic projection useful in marine and aeronautical navigation.

A map, in digital form, may be provided, or available, in a first projection, but the intended use of the map may guide the selection of a second projection. In such cases, it may be desirable to re-project the map, i.e. transform the map from the first projection to the second projection. Conventionally, this type of re-projection may have required point-by-point calculation from the planar (or Cartesian) coordinates of the first projection back to a geographical coordinate system (such as latitude/longitude) and then from the geographical coordinates into the planar coordinates of the second projection.

Briefly stated, the present invention is directed to a system and method for re-projecting a map image from a first projection into a map image having a second projection using computer graphics techniques.

Texture mapping is a process of mapping a texture image, which may be referred to as a texture map or, simply, a texture, onto a polygon so that the texture image conforms to the surface of the polygon. For example, texture mapping may often be used in computer game representations of three-dimensional objects to produce images that may be more realistic when compared to solid color or shaded polygons. However, texture mapping can be applied to fields other than computer games, as will be described below. There may be several methods to perform texture mapping, such as linear texture mapping (also called affine texture mapping) and perspective texture mapping.

A basic concept of texture mapping involves taking a source polygon defined within a texture map and projecting it onto a destination polygon. The texture map may most often be defined in rectangular (u,v) coordinates called texels. The vertices of the source polygon may also be defined in terms of these same (u,v) coordinates. However, the source polygon vertices typically do not extend beyond the width or height of the texture map. The destination polygon has the same number of vertices as the source polygon and is defined in (x,y) coordinates. The destination polygon vertices may be obtained by applying transformations f and g to the source polygon vertices so x=f(u) and y=g(v). The transformations f and g may be derived from the same projection equation, meaning each (x,y) vertex in the destination polygon is the projected (u,v) vertex from the source polygon. The projected (x,y) pixels drawn in the destination polygon are taken from the corresponding original (u,v) pixels in the source polygon.

An exemplary embodiment of the present invention includes receiving a digital map image of a portion of the surface of the earth in a first projection, determining a number of rectangular sub-images to divide the map into, extracting each rectangular sub-image from the map, computing the geographic coordinates for each corner of each rectangular sub-image, computing the planar coordinates in a second projection for the four corners of each rectangular sub-image, and supplying the sub-image and second projection coordinates to a texture mapping process. In addition to software, the texture mapping process may also include optional hardware for the acceleration of the texture mapping computations, thereby potentially reducing the demand for resources on a processor performing the re-projecting by offloading some of the burden of performing the re-projection to specialized graphics hardware and/or software.

BRIEF DESCRIPTION OF THE DRAWINGS

The present invention will be described with reference to the accompanying drawings, wherein.

DETAILED DESCRIPTION

Figure 1:
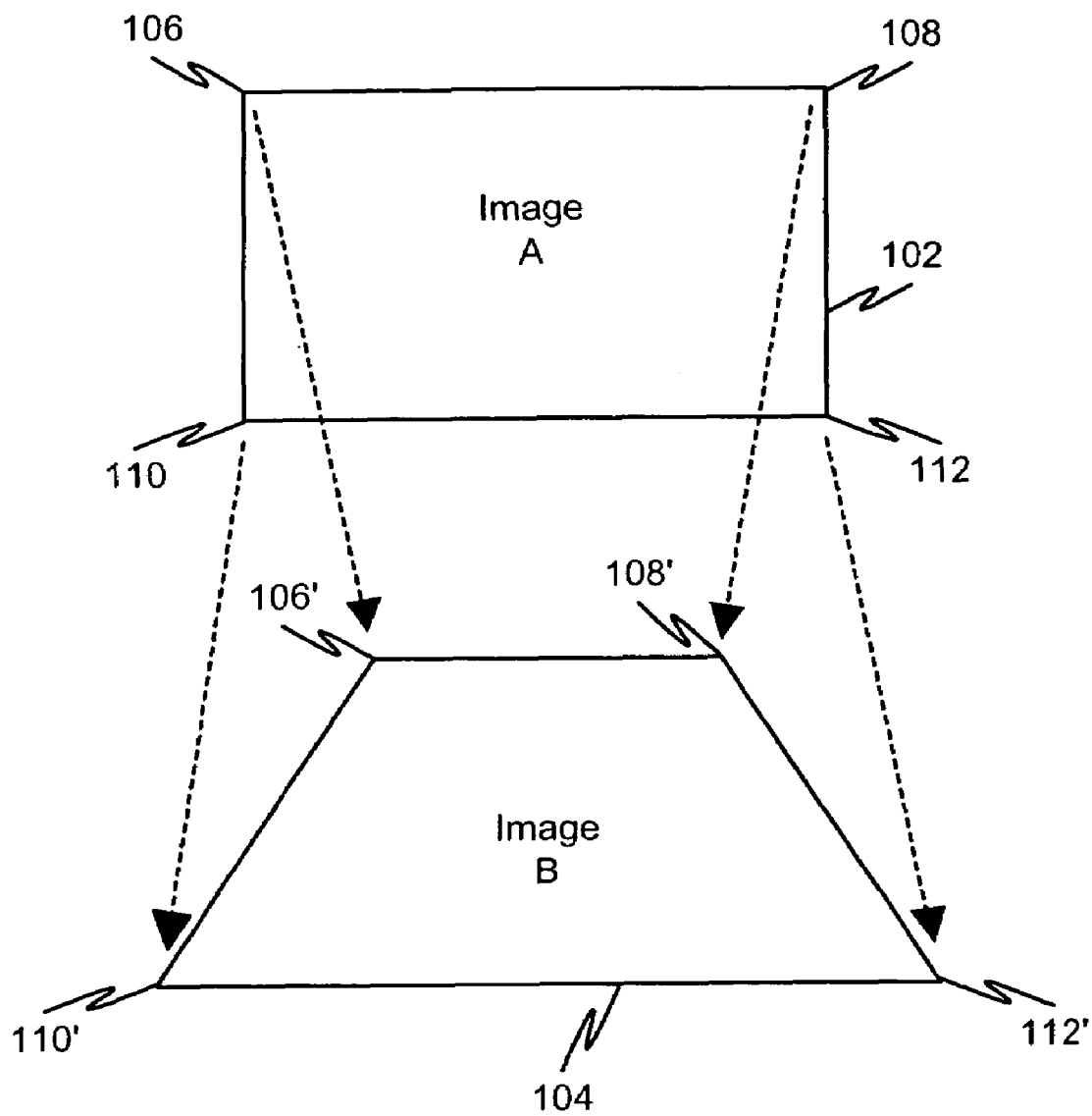
FIG. 1 shows a diagram of an exemplary map image before and after reprojection.

FIG. 1 shows a diagram of an exemplary map image before and after reprojection. In particular, map image A 102 is bounded by four corners 106, 108, 110 and 112. Map image B 104 is an exemplary result of reprojection. Map image B is bounded by four corners 106', 108', 110' and 112'. Map image B 104 has been re-projected from the first projection of map image A 102 into a second projection. As a result, the upper-left corner 106 of map image A 102 has been translated into an upper-left corner 106' of map image B 104. The upper-right corner 108 of map image A 102 has been translated into the upper-right corner 108' of map image B 104. The lower-right corner 112 of map image A 102 has been translated into the lower-right corner 112' of map image B 104. The lower-left corner 110 of map image A 102 has been translated into the lower-left corner 110' of map image B 104.

Figure 2:
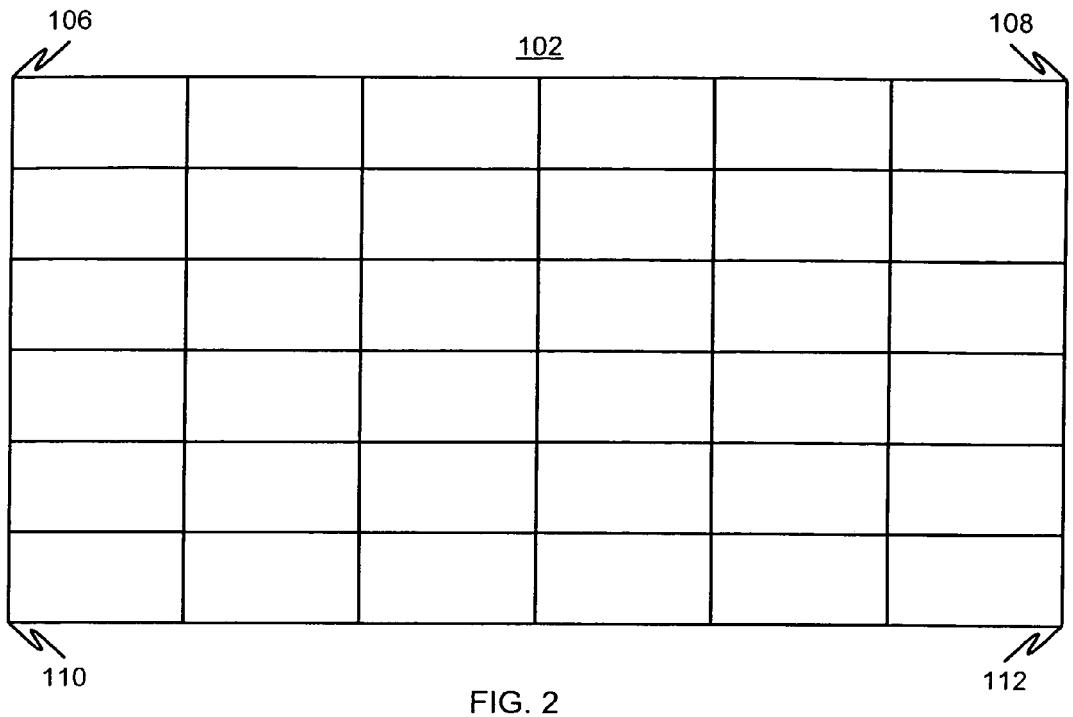
FIG. 2 shows a diagram of an exemplary map image, divided into a number of sub-images, in a first projection.

FIG. 2 shows a diagram of an exemplary map image, divided into a number of sub-images, in a first projection. In particular, a map image 102 has four corners (106, 108, 110 and 112). The map image 102 has been divided into thirty-six sub-images as shown by the grid lines. Dividing the map image into sub-images may allow for a more accurate reprojection into a second map image. As will be described in detail below, dividing the map image into sub-images may be a step in re-projecting the map image using graphical techniques.

Figure 3:
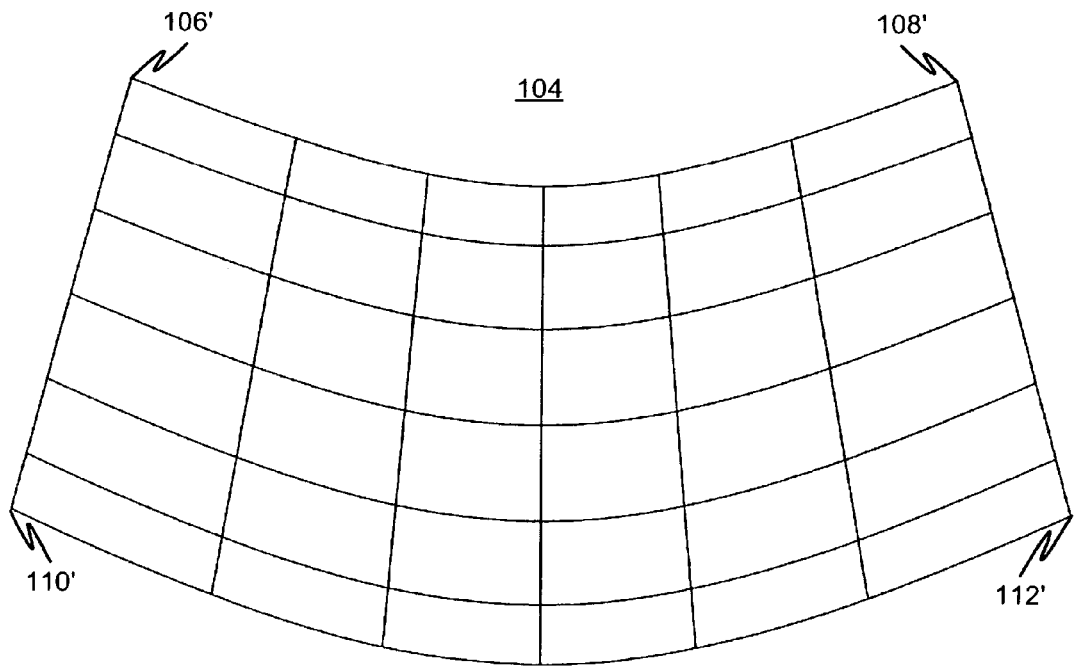
FIG. 3 shows a diagram of an exemplary map image, divided into a number of sub-images, after reprojection into a second projection.

FIG. 3 shows a diagram of an exemplary map image, divided into a number of sub-images, following reprojection into a second projection. In particular, a second map image 104 has four corners (106', 108', 110' and 112'). The four corners (106', 108', 110' and 112') are a result of reprojection from the four corners (106, 108, 110 and 112) of map image 102 shown in FIG. 2. Like map image 102 of FIG. 2 the re-projected map image 104 is also divided into thirty-six sub-images. These sub-images have been re-projected using graphical techniques from the sub-images of the first map image 102 into the sub-images of the second map image 104.

Figure 4:
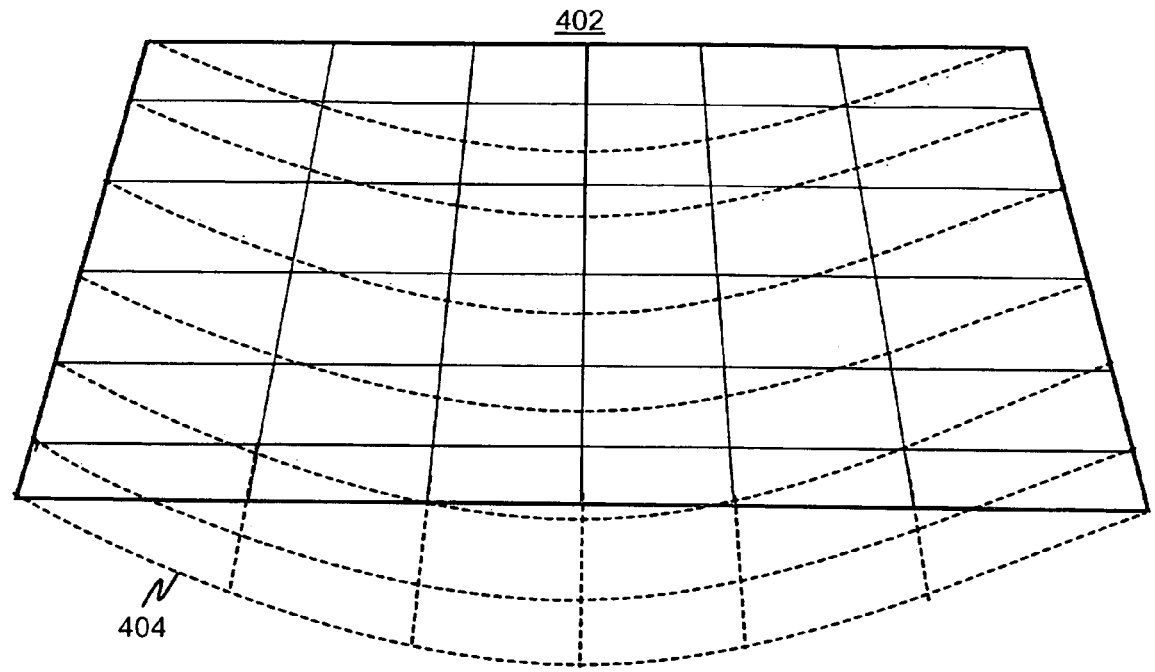
FIG. 4 shows a diagram of an exemplary map image divided into one sub-image, where the sub-image has been re-projected using a graphical technique according to the present invention.
Figure 5:
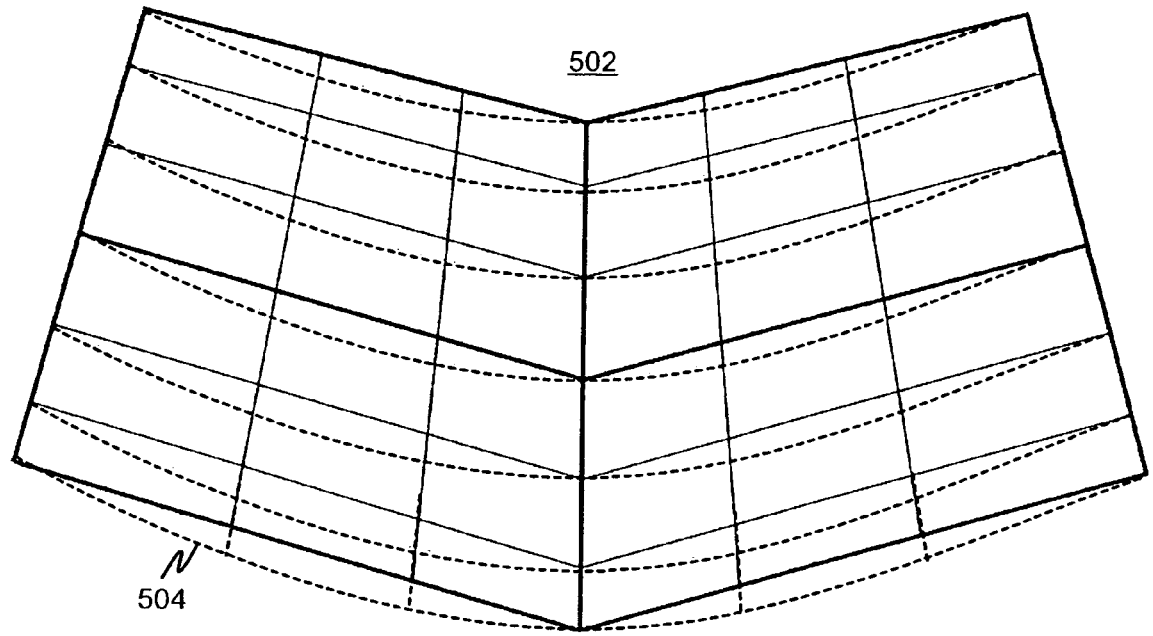
FIG. 5 shows a diagram of an exemplary map image divided into four sub-images, where each sub-image has been re-projected using a graphical technique according to the present invention.
Figure 6:
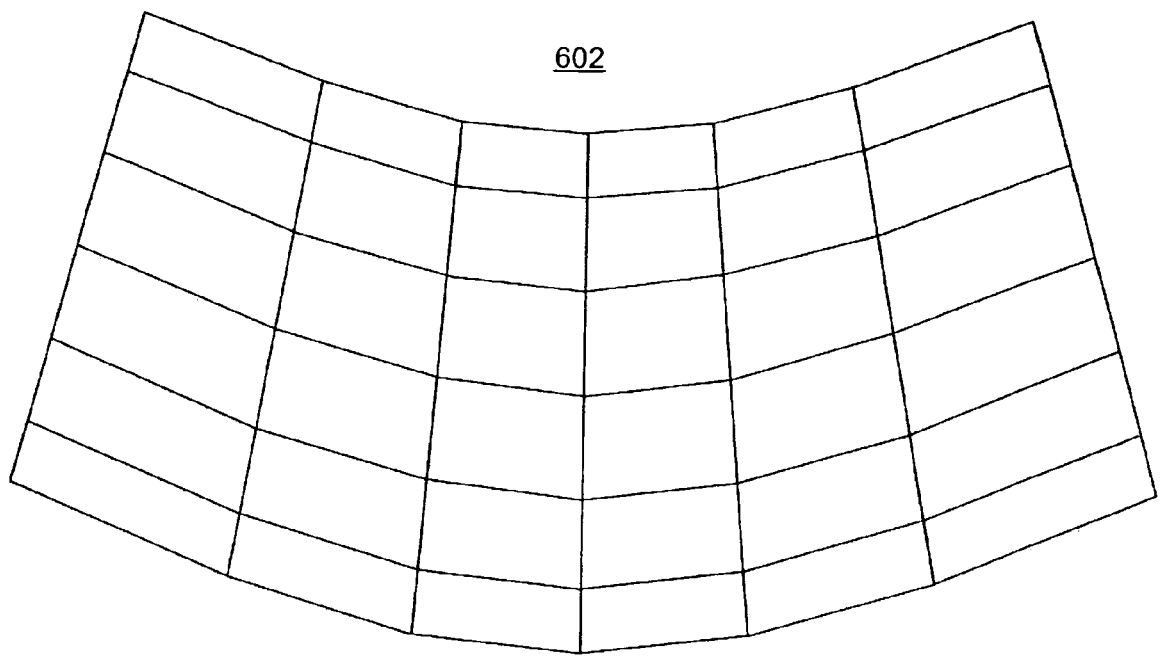
FIG. 6 shows a diagram of an exemplary map image divided into thirty-six sub-images, where each sub-image has been re-projected using a graphical technique according to the present invention.

The determination of the number of sub-images to divide an image into may depend on one or more factors, such as, for example, memory, desired resolution, desired accuracy, computation time requirement, and/or the like. FIGS. 4–6 show the effect that the number of sub-images has on accuracy of the re-projected image.

FIG. 4 shows a diagram of an exemplary map image divided into one sub-image, where the sub-image has been re-projected using a graphical technique according to the present invention. In particular, the re-projected image 402 is represented by a solid line and the preferred reprojection image 404 is represented by a dashed line. While the four outside corners of both images are aligned, it may be observed that the inner portions of the re-projected image 402 do not align with the preferred reprojection 404.

FIG. 5 shows a diagram of an exemplary map image divided into four sub-images, where each sub-image has been re-projected using a graphical technique according to the present invention. In particular, a re-projected image 502 is represented by a solid line and a preferred reprojection image 504 is represented by a dashed line. Dividing the image 502 into four sub-images represents an improvement over the reprojection shown in FIG. 4. However, it may still be observed from FIG. 5 that the out corners and center corners of reprojection 502 are aligned with the preferred projection 504, while the points between the center and outer edges are not aligned with the corresponding points on the preferred projection image 504.

FIG. 6 shows a diagram of an exemplary map image divided into thirty-six sub-images, where each sub-image has been re-projected using a graphical technique according to the present invention. In particular, a re-projected image 602 is represented by solid lines. The re-projected image 602 aligns with the preferred reprojection image (not shown). By using thirty-six sub-images, the desired level of accuracy was able to be achieved and the re-projected image matches the preferred reprojection image.

Figure 7:
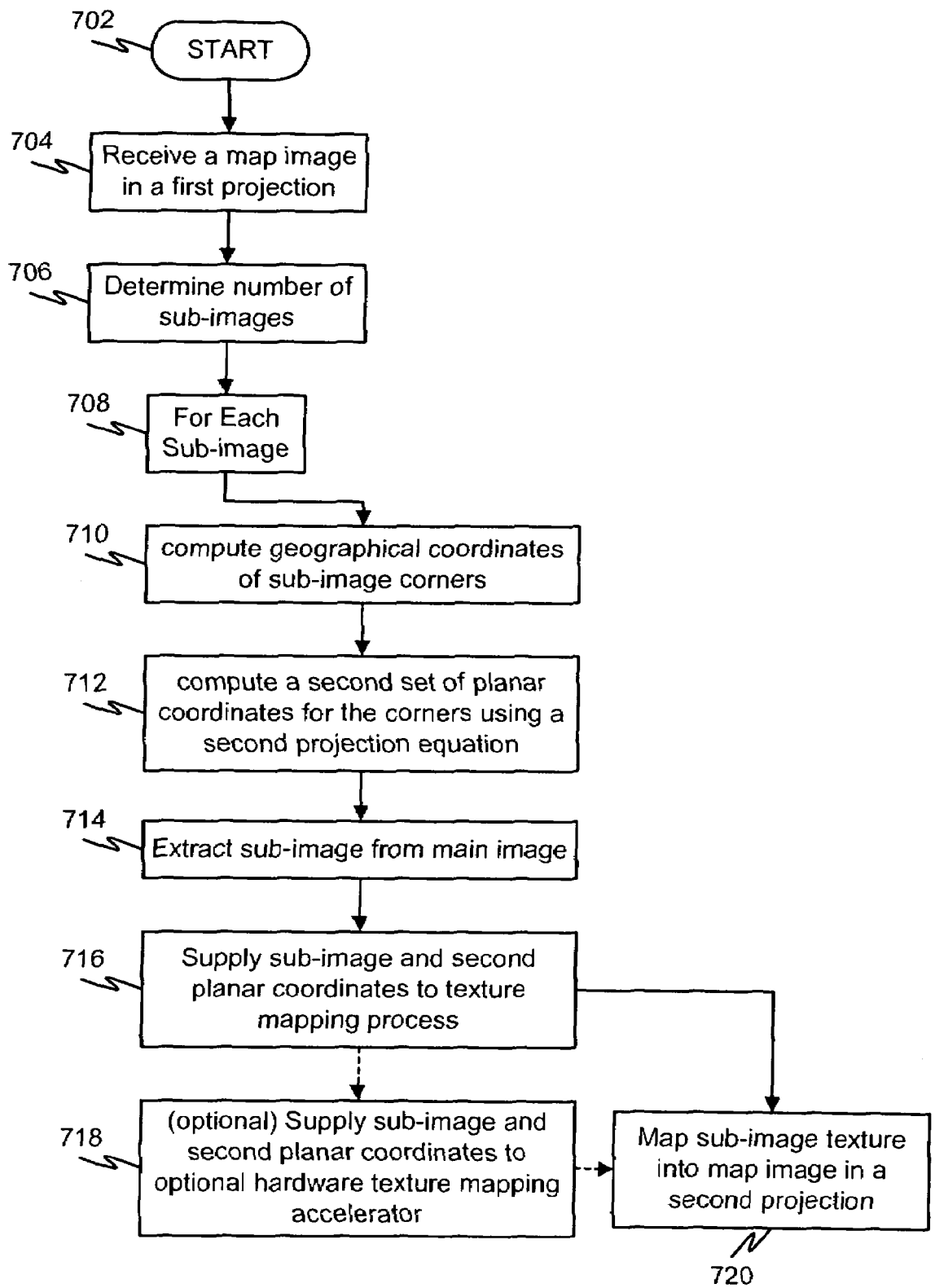
FIG. 7 shows a flowchart of an exemplary method of re-projecting map images using graphical techniques according to the present invention.

FIG. 7 shows a flowchart of an exemplary method of re-projecting map images using graphical techniques according to the present invention. In particular, control begins in step 702 and continues to step 704. In step 704, a map image in a first projection is received. Control continues to step 706.

In step 706, the number of sub-images to divide the image into is determined. The number of sub-images is based on the desired size of the sub-images and the size of the original image. The size of the sub-image may be selected to balance the accuracy of the re-projected image against the resources available to perform the reprojection, such as time, memory capacity, processor cycles, and/or the like. The determination of sub-image size and, consequently, the number of sub-images may be automatic, manual, or a combination of automatic and manual. Control continues to step 708.

In step 708, control will loop and a sequence of steps (710–720) will be performed for each sub-image. Control continues to step 710.

In step 710, reference coordinates (e.g. latitude and longitude) are determined for each of the four sub-image planar corner coordinates using the inverse of a first projection equation. Control continues to step 712.

In step 712, a second set of planar corner coordinates is determined from the reference coordinates computed in step 712 for each of the sub-image corner coordinates using a second projection equation. Control continues to step 714.

In step 714, the sub-image is extracted from the first map image. Control continues to step 716.

In step 716, the sub-image and the set of second projection planar coordinates are supplied to a texture mapping process. In an exemplary embodiment of the present invention, the sub-image is placed into a texture memory storage space and the coordinates are placed into a geometry memory storage space. Control continues to step 718 if texture mapping acceleration hardware is available and being used, or to step 720 if texture mapping hardware is not available or not being used for this operation.

In step 718, the sub-image and second set of planar coordinates are supplied to optional texture mapping accelerator hardware. This hardware may be specially designed to accelerate the texture mapping process, thereby providing a performance increase during texture mapping operations. Control continues to step 720.

In step 720, the texture mapping process maps the sub-image into the second image memory according to the second set of planar corner coordinates. If additional sub-images remain to be processed, control continues to step 710, if all sub-images have been processed, then control continues to step 722, where control terminates.

Figure 8:
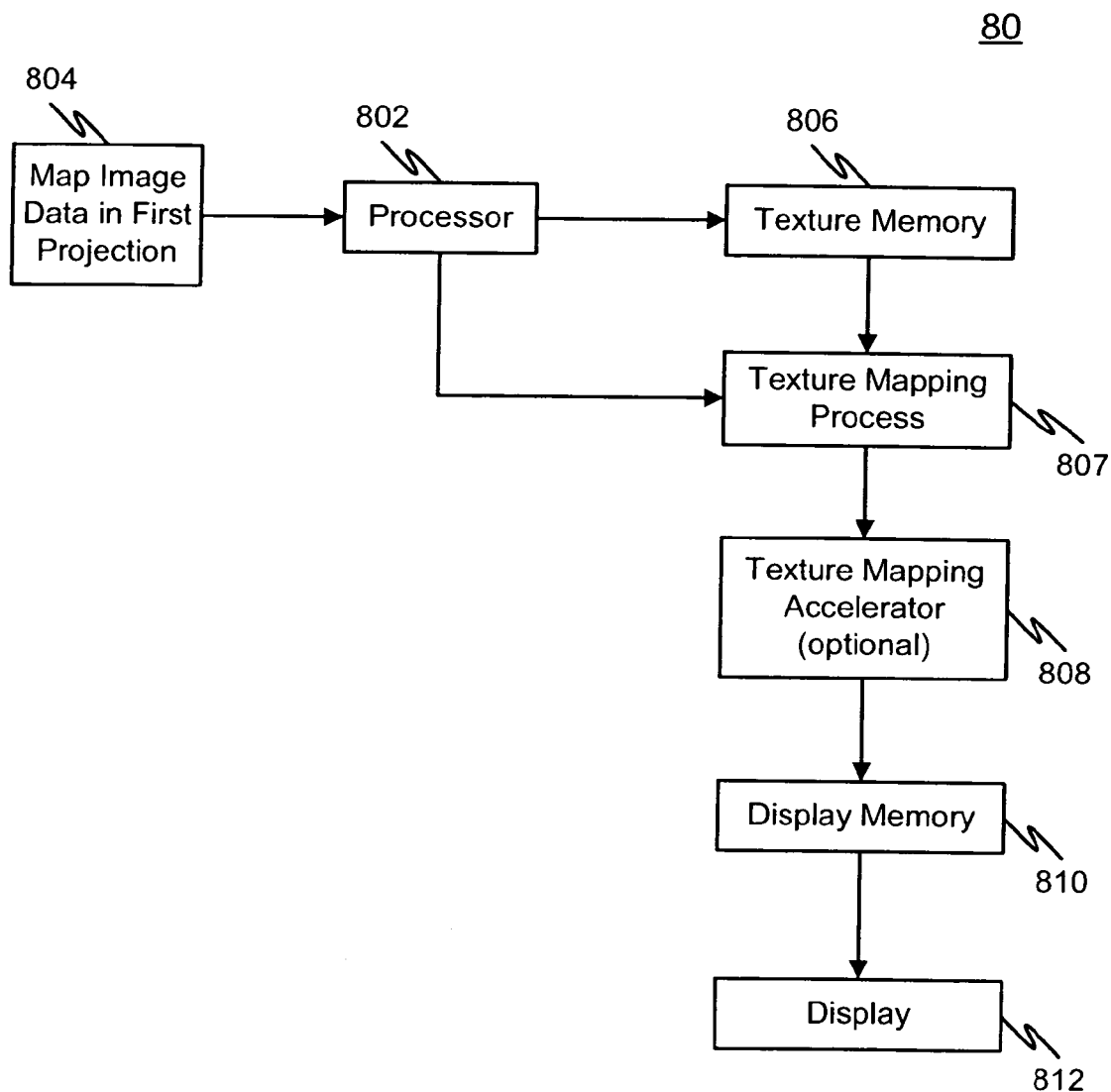
FIG. 8 shows a block diagram of an exemplary system for re-projecting map images according to the present invention.

FIG. 8 shows a block diagram of an exemplary system for re-projecting map images according to the present invention. The system shown in FIG. 8 may be used on various platforms, including, for example, aircraft, naval vessels, spacecraft, land vehicles, desktop processors, handheld processors, and/or the like. In particular, a map reprojection system 80 comprises a processor 802, a map image in a first projection 804, a texture memory 806, a texture mapping process 807, an optional texture mapping accelerator 808, a display memory 810 and a display 812.

In operation, the processor 802 receives a map image in a first projection 804. The processor 802 divides the map image in a first projection 804 into sub-images (not shown), computes new planar coordinates for the four corners of each sub-image and places each sub-image and the new planar coordinates of the corners into the texture memory 806. The number of sub-images is based on the desired size of the sub-images and the size of the original image. The size of each sub-image may be selected to balance the accuracy of the re-projected image against the resources available to perform the reprojection, such as time, memory capacity, processor cycles, and/or the like. The determination of sub-image size and, consequently, the number of sub-images may be automatic, manual, or a combination of automatic and manual.

The texture mapping process 807 receives each sub-image and set of planar corner coordinates in a second projection. The texture mapping process may be software, hardware, or a combination of software and hardware. The texture mapping process 807 may include optional texture mapping acceleration hardware 808. In an exemplary embodiment of the present invention, the texture mapping acceleration hardware may reside on a graphics processing card for displaying the map images. The texture mapping acceleration hardware 808 may be designed to improve the speed, memory, usage, and/or the like associated with the operation of texture mapping.

The texture mapping process 807 maps the sub-image into a map image in a second projection using the supplied second set of planar corner coordinates. The second map image is placed into display memory 810, which is received by the display 812 and used to display the re-projected map image.

An exemplary embodiment of the system and method of the present invention may save computation time and software complexity as compared to traditional reprojection techniques. The computation cycle savings on a sub-image having a side length of j which is a power of two is shown by the equation below:

Computation cycle savings=$(2^j-4)$*(number of computation cycles needed to calculate inverse first projection and second projection).

An exemplary pseudocode listing is shown below to aid in understanding the present invention. It should be appreciated that the pseudocode listing is an exemplary embodiment for illustration purposes. Further, it should be appreciated that the systems and methods of the present invention may be practiced in a variety of implementations beyond those shown here.

Prior to the texture mapping process, the sub-image texture data may be uploaded to video memory. In an exemplary embodiment, each sub-image is assigned a unique identifier for use by the graphics subsystem. Before uploading a texture to the video memory some setup takes place so the graphics subsystem is properly configure to process the image data that is passed to it. The setup calls should be made once per texture. The pseudo code listing below provides additional details of an exemplary texture image setup, an uploading sequence, and a simple exemplary texture mapping.

Pseudocode Listing

BindTexture(TEXTURE_2D, 5);
PixelStorei(UNPACK_ALIGNMENT, 1);
TexParameteri (TEXTURE_2D, TEXTURE_WRAP_T, REPEAT);
TexParameteri (TEXTURE_2D, TEXTURE_WRAP_T, REPEAT);
TexParameteri (TEXTURE_2D, TEXTURE_MAG_FILTER, LINEAR);
TexParameteri (TEXTURE_2D, TEXTURE_MIN_FILTER, LINEAR);
TexEnvf(TEXTURE_ENV, TEXTURE_ENV_MODE, MODULATE);
TexImage2D (TEXTURE_2D, 0, RGB, imageWidth, imageHeight, 0, RGB, UNSIGNED_BYTE, imageData);
Enable (TEXTURE_2D);
Begin (QUADS);
TexCoord2f (0.0, 0.0);
Vertex3f (0.0, 0.0, 0.0);
TexCoord2f (1.0, 0.0);
Vertex3f (10.0, 0.0, 0.0);
TexCoord2f(1.0, 1.0);
Vertex3f (10.0, 10.0, 0.0);
TexCoord2f (0.0, 1.0);
Vertex3f (0.0, 10.0, 0.0);
End ();

The paragraphs below provide a description of the pseudocode statements in the listing above.

BindTexture

The BindTexture call informs the graphics subsystem which texture "id" is being referenced. A texture "id" is a number used as a reference identifier for the texture by the graphics subsystem. The BindTexture call as shown makes a texture that is associated with the ID of 5 the active texture. Once the BindTexture call has been made, the graphics subsystem will interpret any calls that have to do with texture mapping as effecting this texture.

PixelStorei

The PixelStorei call tells the graphics subsystem how the data that is going to be uploaded is aligned in memory. The pseudocode call indicates to the graphics subsystem that the pixel data which is going to be passed in to the graphics subsystem is aligned in byte order, i.e. the data has one byte for each color component, one for red, green and blue. The alignment of data may vary depending upon the source data.

TexParameteri

The TexParameteri call sets parameters for the current texture. The parameters are passed in to the graphics subsystem and affect the way a texture is displayed.

TexEnvf

The TexEnvf call sets environment variables for the current texture, telling the graphics subsystem how the texture will act when it is rendered into an image.

The active texture is set to MODULATE. The MODULATE attribute allows effects such as lighting and coloring to be applied to a texture, which may be used during the rendering of the final map image.

TexImage2D

The glTexImage2D call uploads the texture to the video memory for use in texture mapping. The target of the TexImage2D call is TEXTURE_2D in this example. The level of detail number, is 0 for purposes of this example.

The internal components parameter tells the graphics subsystem bow many color components to represent internally from the texture that is uploaded. In the case of the exemplary constant RGB, the number of color components is equal to 3.

The width and height of the image data are typically integers that are equal to 2n+2(border) for some integer n. In other words, in the exemplary embodiment shown, the texture width and height may be a power of two. The image border parameter is set to 0 in this example indicating that image borders are not being used. The format of the pixel data that will be uploaded is set to RGB. The type of data that will be uploaded is set to UNSIGNED_BYTE.

The pointer to the image data is the sub-image data that will be uploaded to the video memory. Once the call to TexImage2D is complete the sub-image memory may be freed since the texture is already uploaded into video memory.

The texture is now ready to be uploaded to video memory and applied to a geometry. The process for applying a texture to geometry depends on what type of data is being processed and how the original image has been divided into sub-images.

The pseudocode example illustrates the texturing of a quad. In texturing a geometry, each texture coordinate is specified before each corresponding geometry vertex that makes up a face. In the pseudo code example, each of the four corners of the quad are specified in texture/vertex order.

A program, system or method of re-projecting map images, in accordance with the present invention, can be implemented on a general-purpose computer, a special-purpose computer, a programmed microprocessor or microcontroller and peripheral integrated circuit element, and ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions described herein can be used to implement a program, system or method of re-projecting map images according to this invention.

Furthermore, the disclosed system may be readily implemented in software using object or object-oriented software development environments that provide portable source code that can be used on a variety of computer platforms. Alternatively, the disclosed program, system and method for re-projecting map images may be implemented partially or fully in hardware using standard logic circuits or a VLSI design. Other hardware or software can be used to implement the program, system or method in accordance with this invention depending on the speed and/or efficiency requirements of the systems, the particular function, and/or a particular software or hardware system, microprocessor, or microcomputer system being utilized. The map re-projection program, system and method illustrated herein can readily be implemented in hardware and/or software using any known or later developed systems or structures, devices and/or software by those of ordinary skill in the applicable art from the functional description provided herein and with a general basic knowledge of the computer and electrical arts.

Moreover, the disclosed methods may be readily implemented in software executed on programmed general-purpose computer, a special purpose computer, a microprocessor, or the like. In these instances, the systems and methods of this invention can be implemented as program embedded on personal computer such as JAVA® or CGI script, as a resource residing on a server or graphics workstation, as a routine embedded in a dedicated encoding/decoding system, or the like. The system can also be implemented by physically incorporating the system and method into a software and/or hardware system, such as the hardware and software systems of an image processor.

It is, therefore, apparent that there is provided in accordance with the present invention, a program, system and method for re-projecting map images. While this invention has been described in conjunction with a number of embodiments, it is evident that many alternatives, modifications and variations would be or are apparent to those of ordinary skill in the applicable arts. Accordingly, applicants intend to embrace all such alternatives, modifications, equivalents and variations that are within the spirit and scope of this invention.

What is claimed is:

1. A computer readable medium encoded with a computer program product for enabling a computer to re-project digital map images comprising:
    software instructions for enabling the computer to perform predetermined operations; and
    a computer readable medium bearing the software instructions;
    the predetermined operations including the steps of:
        receiving digital map data representative of a first map image in a first projection;
        determining a number of rectangular sub-images to divide the digital map data into, wherein the number of rectangular sub-images is based on the size of the rectangular sub-images;
        extracting each rectangular sub-image from the digital map data;
        computing the geographic coordinates of each corner of each rectangular sub-image from first planar coordinates; and computing second planar coordinates of each corner of each rectangular sub-image using a second projection equation; and
        supplying each rectangular sub-image and corresponding second planar coordinates to a texture mapping process for graphically mapping each rectangular sub-image into a second map image using a texture mapping graphical technique, wherein the computer re-projects map images.

2. The computer program of claim 1, wherein the software instructions are configured to execute on a processor in an aircraft.

3. The computer program of claim 1, wherein the software instructions are configured to execute on a processor for navigation.

4. A method for re-projecting a digital map image comprising:
    receiving digital map data representative of a first map image in a first projection;
    determining a number of rectangular sub-images to divide the digital map data into, wherein the number of rectangular sub-images is based on the size of the rectangular sub-images;
    extracting each rectangular sub-image from the digital map data;
    computing the geographic coordinates of each corner of each rectangular sub-image from first planar coordinates;
    computing second planar coordinates of each corner of each rectangular sub-image using a second projection equation; and
    supplying each rectangular sub-image and corresponding second planar coordinates to a texture mapping process for graphically mapping each rectangular sub-image into a second map image using a texture mapping graphical technique.

5. The method of claim 4, further comprising the step of supplying each rectangular sub-image and corresponding second planar coordinates to a texture mapping accelerator for graphically mapping each rectangular sub-image into a second map image using a texture mapping graphical technique.

6. A system for re-projecting a digital map image comprising:
    a processor for re-projecting the digital map image;

a memory coupled to the processor for storing a program, a first digital map image in a first projection, a second digital map image in a second projection, and sub-images of the first digital map image;

a program loaded into the memory comprising means for re-projecting the digital map image in the first projection into the second digital map image in the second projection; and a graphics subsystem coupled to the processor comprising a texture mapping process, wherein the means for re-projecting the digital map image comprises:

means for extracting one or more rectangular sub-images from the digital map data;

means for computing the geographic coordinates of each corner of each rectangular sub-image from first planar coordinates;

means for computing second planar coordinates of each corner of each rectangular sub-image using a second projection equation;

and means for supplying each rectangular sub-image and corresponding second planar coordinates to a texture mapping process for graphically mapping each rectangular sub-image into the second digital map image using a texture mapping graphical technique.

7. The system of claim 6, wherein the texture mapping process comprises software.

8. The system of claim 6, wherein the texture mapping process comprises a hardware texture mapping accelerator.

9. The system of claim 6, wherein the texture mapping process comprises a combination of software and hardware texture mapping accelerators.

10. The system of claim 6, wherein the system is adapted for installation in a vehicle.

11. The system of claim 10, wherein the vehicle is an aircraft.

12. The system of claim 10, wherein the vehicle is a boat.

13. The system of claim 10, wherein the vehicle is a terrestrial vehicle.

14. The system of claim 10, wherein the vehicle is a spacecraft.

15. A system for re-projecting a digital map image comprising: a processor; a first memory coupled to the processor for storing a digital map image in a first projection; a second memory coupled to the processor storing sub-images for use as textures; a computer readable medium encoded with a computer program that when executed causes a processor to re-project the digital map image in a first projection into a digital map image in a second projection; a graphics subsystem coupled to the processor comprising a texture mapping process, wherein the computer program is configured to determine a number of rectangular sub-images in which to divide the digital map image in a first projection, and wherein the number of rectangular sub-images is based on the size of the rectangular sub-images; and a means for displaying the digital map image in the second projection.

16. The system of claim 15, further comprising a hardware texture mapping accelerator in communication with the processor.

17. The system of claim 15, wherein the system is configured to be operated on a vehicle.

18. The system of claim 17, wherein the vehicle is an aircraft.

* * * * *